US010267242B2

United States Patent
Tang et al.

(10) Patent No.: US 10,267,242 B2
(45) Date of Patent: Apr. 23, 2019

(54) COMBINATION CONTROL ASSEMBLY OF DUAL FUEL INTERNAL COMBUSTION ENGINE

(71) Applicant: HANGZHOU POWER YOUNG TECHNOLOGY CO. LTD., Hangzhou, Zhejiang (CN)

(72) Inventors: Longxin Tang, Zhejiang (CN); Jie Li, Zhejiang (CN)

(73) Assignee: HANGZHOU POWER YOUNG TECHNOLOGY CO. LTD., Hangzhou (CN)

(*) Notice: Subject to any disclaimer, the term of this patent is extended or adjusted under 35 U.S.C. 154(b) by 0 days.

(21) Appl. No.: 15/658,247

(22) Filed: Jul. 24, 2017

(65) Prior Publication Data

US 2018/0245523 A1    Aug. 30, 2018

(30) Foreign Application Priority Data

Feb. 24, 2017 (CN) .................. 2017 2 01706088 U

(51) Int. Cl.
   *F02B 13/00*    (2006.01)
   *F02D 19/06*    (2006.01)

(52) U.S. Cl.
   CPC ................. *F02D 19/0613* (2013.01)

(58) Field of Classification Search
   CPC .......... F02M 1/02; F02M 13/08; F02M 26/54; F23N 1/007; F23N 2035/18; H01H 25/06; H01H 19/14; H01H 19/00; H01H 19/02; H01H 19/46; Y10T 137/86831; Y10T 70/5252; Y10T 70/527; Y10T 74/18936; F02D 11/04; F02D 19/0613

USPC .......... 123/575; 200/11 R, 14, 336, 564, 568
   See application file for complete search history.

(56) References Cited

U.S. PATENT DOCUMENTS

| | | | | |
|---|---|---|---|---|
| 2,065,167 | A * | 12/1936 | Wirth | F02M 1/02 251/294 |
| 2,402,435 | A * | 6/1946 | Newton | G05D 23/1902 200/83 S |
| 4,631,153 | A * | 12/1986 | Tamba | F02M 1/02 123/336 |
| 5,703,339 | A * | 12/1997 | Rapp | H01H 27/002 200/17 R |
| 6,198,055 | B1 * | 3/2001 | Hughes | H01H 25/04 16/441 |

(Continued)

*Primary Examiner* — Marguerite McMahon
*Assistant Examiner* — James Kim
(74) *Attorney, Agent, or Firm* — Global IP Services; Tianhua Gu

(57) ABSTRACT

A combination control assembly of dual fuel internal combustion engine comprises a dial (2) that can be rotated to manipulate operation of a dual fuel internal combustion engine; a turntable (3) includes a disk body (301) and a shift lever (302), characterized in that the shift lever (302) is settled on the disk body (301); a first rotating part (4) that can be rotated by cooperating with the shift lever (302); a second rotating part (9) that can be rotated by cooperating with the shift lever (302); a first fuel valve (6) opened by the first rotating part (4), a second fuel valve (11) opened by the second rotating part (9). The combination control assembly controls the first fuel valve (6) and the second fuel valve (11), simplifying the manual operation and keeping the engine runs stable.

7 Claims, 6 Drawing Sheets

(56) References Cited

U.S. PATENT DOCUMENTS

| | | | |
|---|---|---|---|
| 2007/0084450 A1* | 4/2007 | Oka | B60K 28/08 |
| | | | 123/675 |
| 2014/0202430 A1* | 7/2014 | Monros | F02D 19/0615 |
| | | | 123/445 |
| 2015/0233311 A1* | 8/2015 | Repasky | F02D 33/003 |
| | | | 123/332 |
| 2015/0316018 A1* | 11/2015 | He | F02P 3/08 |
| | | | 315/209 CD |
| 2016/0363058 A1* | 12/2016 | Sarder | F02D 19/0605 |
| 2016/0363099 A1* | 12/2016 | Collie | F02B 63/04 |

* cited by examiner

COMBINATION CONTROL ASSEMBLY OF DUAL FUEL INTERNAL COMBUSTION ENGINE

FIELD OF THE INVENTION

The present invention relates generally to dual fuel internal combustion engine, more particularly, to a combination control assembly that provides a multiple control of a fuel selection, an engine choke system, fuel shut off valves, and flameout switch through a simple operation.

BACKGROUND OF THE INVENTION

The devices, such as electrical generator, power washer, snow blower, power by internal combustion engine are widely used in the fields like, public facilities, daily live, urban construction, environmental protection etc. It is appreciated that the use of internal combustion engine improves the quality of life. But the large amount of gasoline consumed by the engines has caused serious environmental pollutions and gasoline shortage. The research for use clean energy like LPG, NG and gasoline at same time in a dual fuel internal combustion engine has now received great attention.

The fuel switch, fuel valves, choke cable controller and flameout switch of a dual fuel engine generally is settled independently, resulting a complex operation of selecting fuel source, open fuel valve, adjusting choke cable for a suitable air-fuel ratio, manual or electrical starting for a user to start a engine, and manipulating the flameout switch, close fuel valve for a user to shut down the engine. There are potential risks like, forgetting to close fuel valve, mixture of two fuel went into the engine at a given time, resulting dangerous like, fuel leak, engine damage and fire etc, when use this inefficiency and complex manipulate operation of a dual fuel internal combustion engine.

SUMMARY OF THE INVENTION

In order to solve the above-described shortcomings, the present invention providing a single control for manipulate operation of a dual fuel internal combustion engine by use with a combination control assembly.

In order to solve the above-described shortcomings, A combination control assembly of a dual fuel internal combustion engine that comprising, a dial that can be rotated to manipulate operation of a dual fuel internal combustion engine; a turntable includes a disk body and a shift lever, the shift lever is formed on the disk body; a first rotating part that can be rotated by cooperating with the shift lever; a second rotating part that can be rotated by cooperating with the shift lever; a first fuel valve and a second fuel valve. The rotation of the dial forces the disk body rotating, the shift lever settled on the disk body rotates with the rotating of disk body, forces the first rotating part rotates; the rotation of the first rotating part opens the first fuel valve. The rotation of dial forces the disk body rotating; the shift lever settled on the disk body rotates with the rotating of disk body, forces the second rotating part rotates; the rotation of the second rotating part opens the second fuel valve.

Preferably, a first slot formed in the first rotating part; a second slot formed in the second rotating part; the shift lever slide into the first slot or the second slot, forces the first rotating part or the second rotating part rotating, respectively.

Preferably, a first boss formed in the first rotating part; a first core settled in the first rotating part; the rotation of the first rotating part drives the first core of the first fuel valve to rotate by the cooperation of the first boss and the first core.

Preferably, a second boss formed in the second rotating part, a second core settled in the second rotating part; the rotation of the second rotating part drives the second core of second fuel valve to rotate by the cooperation of the second boss and the second core.

Preferably, a bracket, where the first fuel valve and the second fuel valve disposed in; a limit lever formed on the disk body of turntable; a limit bump formed on the limit lever; a limit groove formed on the bracket; the limit bump is rotatable in the limit groove.

Preferably, an orbit formed on the disk body of turntable, includes a left side incline, a middle low flat lying and a right side incline; the middle low flat lying is formed between the left side incline and the right side inclines.

Preferably, a choke cable assembly fixed on the bracket includes a choke cable, a biasing spring and a choke cable guider; the choke cable guider is fixed on the bracket; the choke cable is disposed in the choke cable guider; the biasing spring presses the end of choke cable on the orbit formed on the turntable, and the choke cable guider limits the choke cable only axially movable.

Preferably, an indicator panel fixed on the bracket through the cooperation of the erection column and the corresponding holes settled on the bracket; the dial is disposed in the indicator panel.

Preferably, a first bump at the edge of the disk body of the turntable; a flameout switch fixed on the indicator panel; the first bump is positioned to interfere with the engine flameout switch, controlling the on-off state of engine flame switch.

Preferably, a second bump formed at the second rotating part; an inching switch settled on the indicator panel; the second bump is positioned to interfere with the inching switch, controlling the on-off state of inching switch.

The present invention has remarkable technical effect because of applying the above technical scheme. Rotating the dial 2 from "OFF" toward "GAS" position, opens the first fuel valve 6 and opens the choke, maintains the second fuel valve 11 in a close position. Rotating the dial 2 from "OFF" toward "LPG" position, simultaneously opens the second fuel valve 11 and opens the choke, and maintains the first fuel valve 6 and first fuel flow path in a close position. Rotating the dial from "GAS" toward the "OFF" position, closes the first fuel valve and maintains the Second fuel valve in a close position, shuts off the engine ultimately. Rotating the dial from "LPG" toward the "OFF" position, closes the second fuel valve, and maintains the first fuel valve in a close position, shuts off the engine ultimately. The combination control assembly has the ability to control the first fuel valve and the second fuel valve 11 respectively. The combination control assembly controls the first fuel valve, the second fuel valve and the choke at the same time through the simple control of the rotational orientation of the dial, simplifying the manual operation and keeping the engine runs stable.

BRIEF DESCRIPTION OF THE DRAWINGS

These and other features, aspects and advantages of the present invention are described in detail below in connection with the accompany drawings. The drawings comprise 7 figures in which.

Above the drawings illustrate of each parts of the digital label refers to the following: 1—indicator panel, 101—erection column, 2—dial, 3—turntable, 301—disk body, 3011—first bump, 302—shift lever, 303—orbit, 3031—right side incline, 3032—middle low flat lying, 3033—left side incline, 304—limit lever, 3041—limit bump, 4—first rotating part, 401—first boss, 402—first slot, 5—bracket, 501—limit groove, 6—first fuel valve, 601—first core, 7—choke cable assembly, 701—choke cable, 702—biasing spring, 703—choke cable guider, 8—flameout switch, 9—second rotating part, 901—second boss, 902—second slot, 903—second bump, 10—inching switch, 11—second fuel valve, 1101—second core.

DETAIL DESCRIPTION OF THE INVENTION

Figure 1:
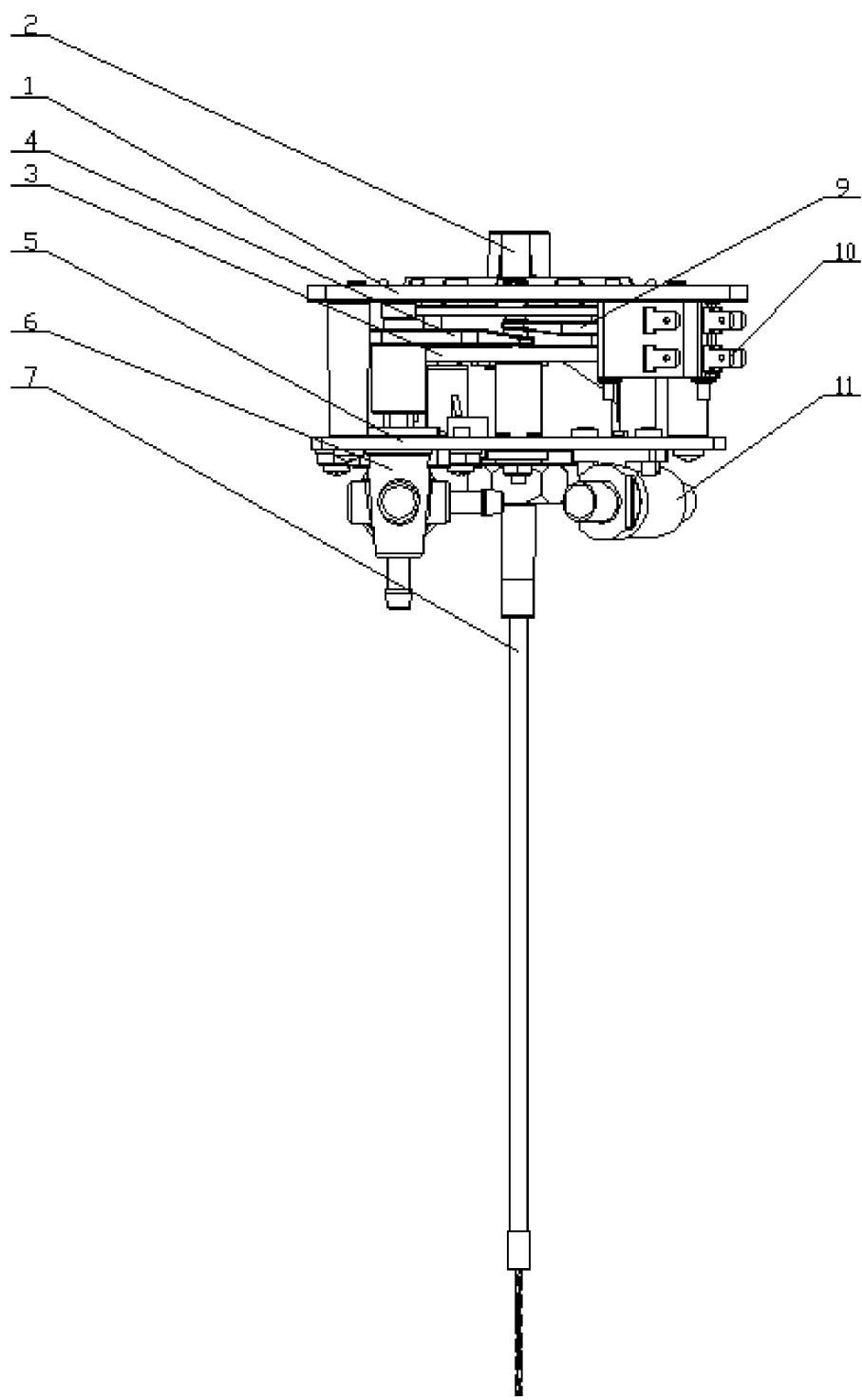
FIG. 1 is a front plan view of the combination control assembly according to the present invention.
Figure 2:
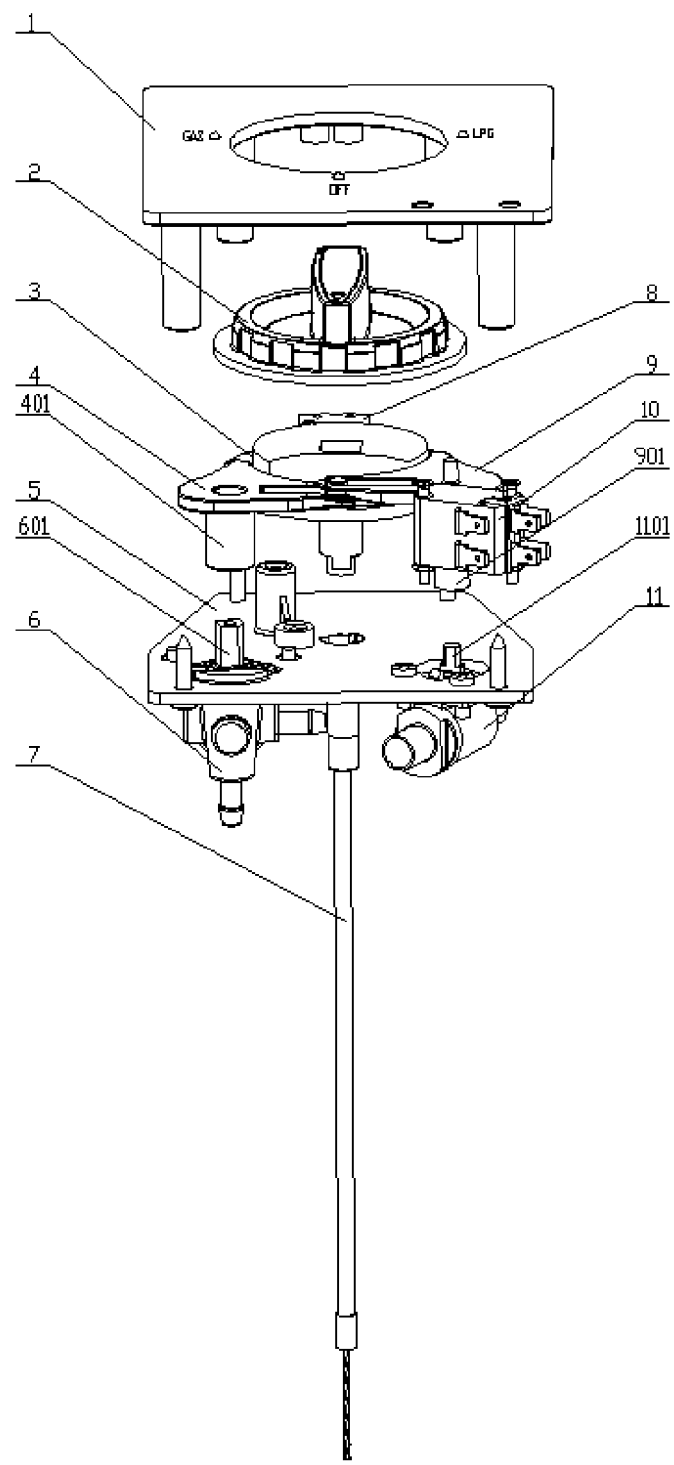
FIG. 2 is an exploded view of the combination control assembly according to the present invention.
Figure 3:
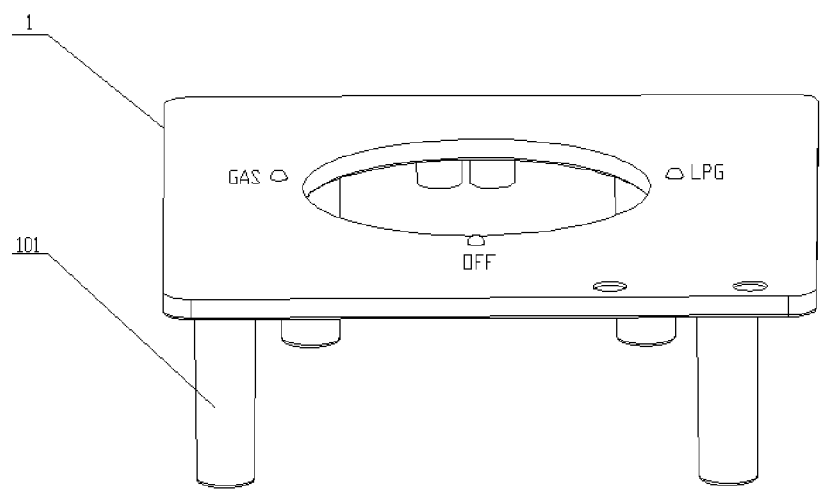
FIG. 3 is an elevation view of the indicator panel, providing an indication of the operating condition of the generator.
Figure 4:
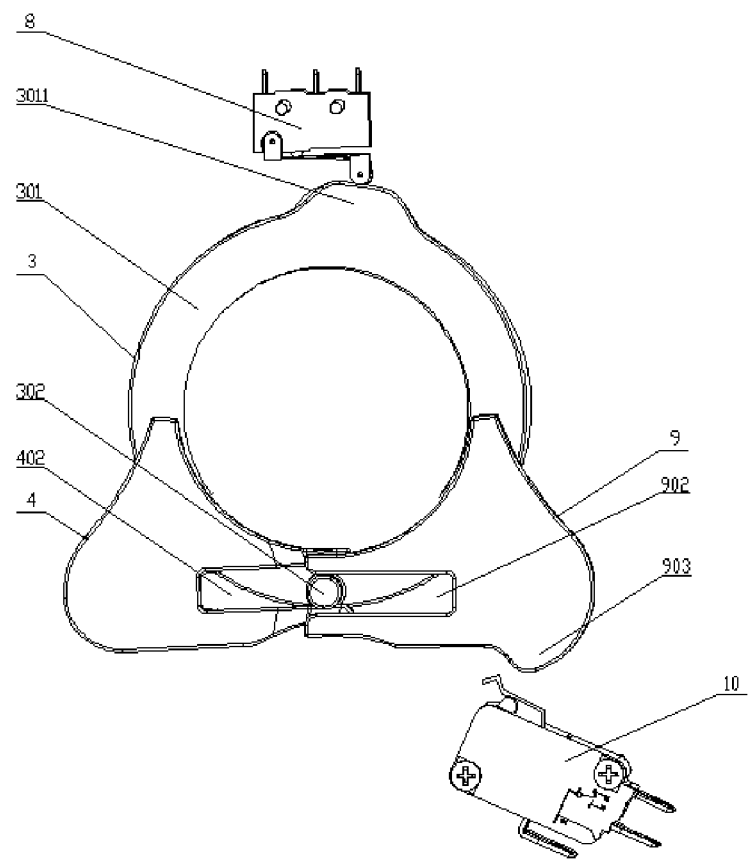
FIG. 4 is a top view of the combination control assembly shown in FIG. 1, with indicator panel, dial and bracket removed therefore, so as to best illustrate the structure of turntable, first rotating part, second rotating part, flame out switch and carburetor solenoid valve switch.
Figure 5:
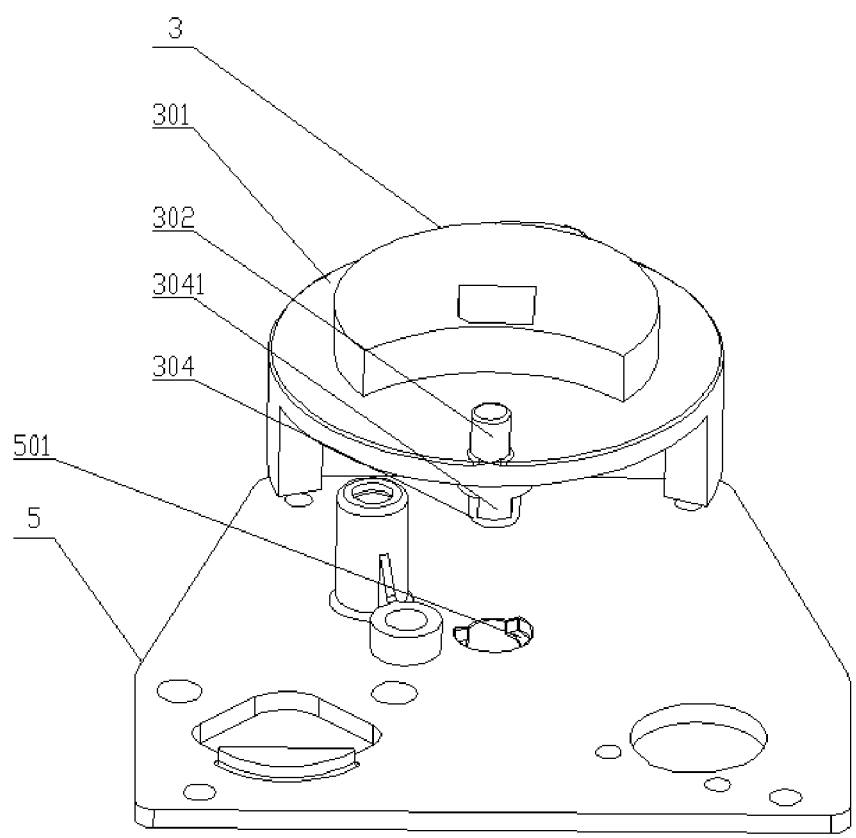
FIG. 5 is a schematic view of the turntable and bracket.
Figure 6:
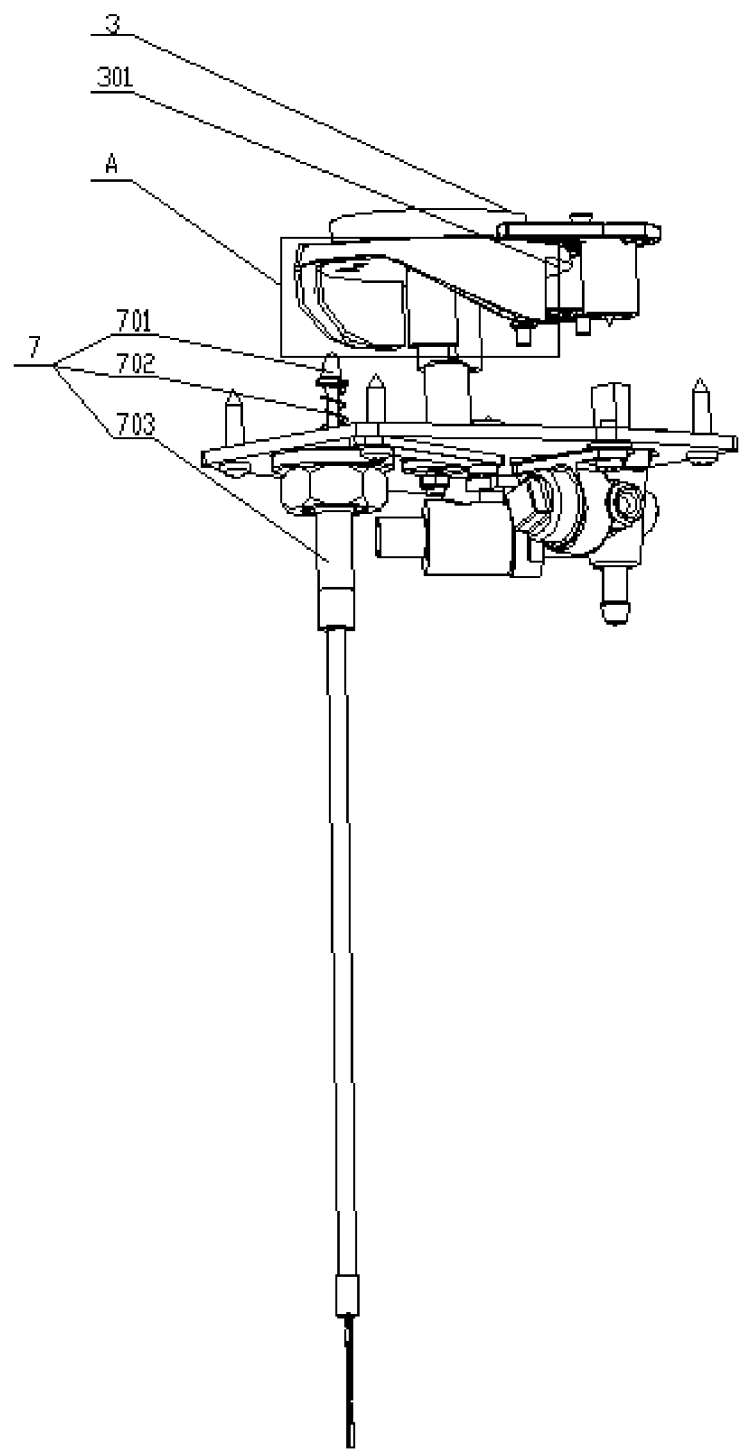
FIG. 6 is a schematic view of the turntable and the choke cable assembly.
Figure 7:
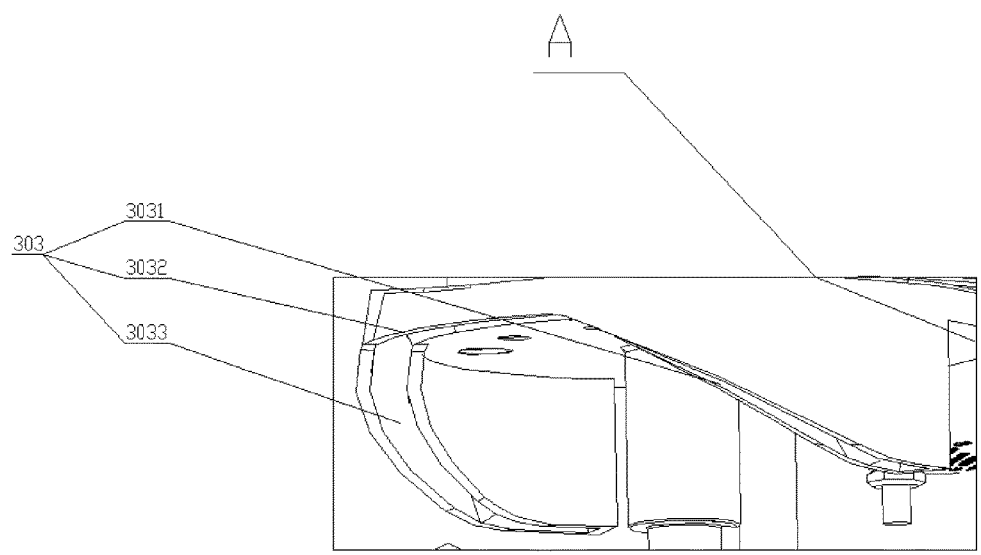
FIG. 7 is an enlarged view of the area "A" shown FIG. 6.

Reference is made to the accompanying drawings in which is shown an illustrative embodiment of the invention from which its features and advantages will be apparent. The combination control assembly of dual fuel engine is shown in greater detail in FIG. 1-7 according to an embodiment of the invention. In general, the combination control assembly includes, a dial 2 that can be rotated to manipulate operation of a dual fuel internal combustion engine, a turntable 3 includes a disk body 301, a shift lever 302 settled on, a first rotating part 4 that can be rotated by cooperating with the shift lever 302 of turntable 3, a second rotating part 9 that can be rotated by cooperating with the shift lever 302 of turntable 3, a first fuel valve 6 includes a first core 601, a second fuel valve 11 include a second core 1101. A first slot is formed in the first rotating part; a second slot is formed in the second rotating part. The rotation of turntable 3 drives the shift lever 302 slide into the first slot 402 or the second slot 902, forces the first rotating part 4 or the second rotating part 9 rotating, respectively. A first boss 401 formed in the first rotating part 4. The rotation of first rotating part 4 drives the first core of the first fuel valve 6 to rotate by the cooperation of the first boss 401 and the first core 601. A second boss 901 formed in the second rotating part 9. The rotation of second rotating part 4 drives the second core of the second fuel valve 11 to rotate by the cooperation of the second boss 901 and the second core 1101. Such that the rotation of dial 2, fixed on the turntable 3, affects a position of the cores 601&1101 of the fuel valves 6&11, thus the rotational orientation of dial 2 determines the opening degree of the first fuel valve 6 and the second fuel valve 11 at a given time.

A bracket 5, where the first fuel valve 6 and the second fuel valve 11 disposed in; a limit lever 304 formed on the disk body 301 of turntable 3; a limit bump 3041 formed on the limit lever 304; a limit groove 501 formed on the bracket 5; The turntable 3 is rotatable related to the bracket 5 unless the interfere of the limit bump 3041 and the limit groove 501 stops the relative rotation.

The turntable 3 further comprising an orbit 303 formed on the disk body 301 of turntable 3, includes a left side incline 3033, a middle low flat lying 3032 and a right side incline 3031. The combination control assembly of claim 6 further comprising a choke cable assembly 7 fixed on the bracket 5 includes a choke cable 701, a biasing spring 702 and a choke cable guider 703. The biasing spring 702 presses the end of choke cable 701 on the orbit 303 formed on the turntable 3, and the choke cable guider 703 limits the choke cable 701 only axially movable, such that the choke cable 701 is only axially movable between an open position and a close position.

The control assembly further comprising an indicator panel 1 fixed on the bracket 5 through the cooperation of the erection column 101 and the corresponding holes settled on the bracket (5). Name "GAS", "LPG", "OFF" settled on the indicator panel 1 indicates the different states of the engine by cooperating with the rotational orientation of the dial 2. A first bump 3011 formed at the edge of the disk body 301 of the turntable 3, positioned to interfere with the engine flameout switch 8 settled on indicator panel 1 only when the first bump 3011 contact with the flameout switch 8. A second bump 903 is formed at the second rotating part 9. A inching switch 10 settled on the indicator panel 1 will sending a signal to the electronic control module when interfered by the second bump 903. The first fuel valve is settled in the first fuel flow path between the first fuel source and the engine, the opening or closing of the first fuel valve determines whether the first fuel flow from the first fuel source can or cannot flow into the engine. The second fuel valve is settled in the second fuel flow path between the second fuel source and the engine, the opening or closing of the second fuel valve determines whether the second fuel flow from the second fuel source can or cannot flow into the engine. When the electronic control module receives the signal from the inching switch, the electronic control module controls the solenoid valve of carburetor close up to cut off the first fuel flow path.

The working flow of the combination control assembly as follows: When the dial 2 is pointed to the "OFF" position of the indicator panel 1, the flameout switch will be interfered by the first bump on the turntable, thereby grounding the ignition circuit, so as to stop the engine. The rotation of turntable 3 drives the shift lever 302 slide into the first slot 402, forces the first rotating part 4 rotating, when rotating the dial 2 from the OFF" toward "GAS" position. The rotation of the first rotating part 4 drives the first core 601 of the first fuel valve 6 rotates from a close position to a open position, permits the first fuel flow from the first fuel source into the engine. The rotating of the dial 2 from the OFF" toward "GAS" position, forces the choke cable 701 slide from the middle low flat lying 3032 to the right side incline 3031. The choke is gradually opened as the choke cable 701 axially moved from a close position to an open position, permits the air flow into the engine.

The rotation of turntable 3 drives the shift lever 302 slide into the second slot 402, forces the second rotating part 4 rotating, when rotating the dial 2 from the OFF" toward "LPG" position. The rotation of the second rotating part 9 drives the second core 1101 of the second fuel valve 11 rotates from a close position to a open position, permits the second fuel flow from the second fuel source into the engine. The inching switch 10 is interfered by the second bump 903 of the second rotating part 9, during the second rotating part 9 rotating, seconding a signal to the electronic control module. The electronic control module controls the carburetor solenoid valve switch cut off the first fuel flow path, when the electronic control module receives the signal from the inching switch, prevent the first fuel flow into the engine. Thus the first fuel retented in the carburetor cannot go into the engine, protecting the engine from damage caused by burning of mixture fuels. The rotating of the dial 2 from the OFF" toward "LPG" position, forces the choke cable 701 slide from the middle low flat lying 3032 to the left side incline 3033. The choke is gradually opened as the choke cable 701 axially moved from a close position to an open position, permits the air flow into the engine. Rotating the dial 2 from "OFF" toward "GAS" position, opens the first fuel valve 6 and choke, maintains the second fuel valve 11 in a close position. Rotating the dial 2 from "OFF" toward "LPG" position, simultaneously opens the second fuel valve 11 and choke, and maintains the first fuel valve 6 and first fuel flow path in a close position. Rotating the dial 2 from "GAS" toward the "OFF" position, closes the first fuel valve 6 and maintains the second fuel valve 11 in a close position, shuts off the engine ultimately. Rotating the dial 2 from "LPG" toward the "OFF" position, closes the second fuel valve 11, and maintains the first fuel valve 6 in a close position, shuts off the engine ultimately. Combination control assembly has the ability to control the first fuel valve 6 and the second fuel valve 11 respectively. The combination control assembly controls the first fuel valve 6, the second fuel valve 11 and the choke at the same time through the simple control of the rotational orientation of the dial 2, simplifying the manual operation and keeping the engine runs stable.

Many modes of carrying out the invention are contemplates as being within the scope of the following claims particularly pointed out and distinctly claiming the subject matter that is regarded as the invention.

What is claimed is:

1. A combination control assembly for a dual fuel internal combustion engine comprising:
   a dial (2) for manual operation of a turntable (3);
   the turntable (3), which includes a disk body (301) and a shift lever (302), the shift lever (302) is formed on the disk body (301);
   a first rotating part (4), which includes a first slot (402) for receiving the shift lever (302) and a first boss (401),
   a second rotating part (9), which includes a second slot (902) for receiving the shift lever (302) and a second boss (901),
   a first fuel valve (6) having a first core (601), which is settled in the first boss (401);
   a second fuel valve (11) having a second core (1101), which is settled in the second boss (901);

the dial (2) turns the turntable (3) in counterclockwise, the shift lever (302) slides into the first slot (402) to push the first rotating part (40) to rotate around the disk body (301), then the first boss (401) turns the first core (601) of the first fuel valve (6) to open;

the dial (2) turns the turntable (3) is rotated in clockwise, the shift lever (302) slides into the second slot (902) to push the second rotating part (40) to rotate around the disk body (301), then the second boss (901) turns the second core (1101) of the second fuel valve (11) to open.

2. The combination control assembly according to claim 1, characterized in that, a bracket (5), where the first fuel valve (6) and the second fuel valve (11) disposed in; a limit lever (304) formed on the disk body (301) of turntable(3); a limit bump (3041) formed on the limit lever(304); a limit groove (501) formed on the bracket(5); the limit bump (3041) is rotatable in the limit groove (501).

3. The combination control assembly according to claim 2, characterized in that, an orbit (303) formed on the disk body (301) of turntable (3), includes a left side incline (3033), a middle low flat lying (3032) and a right side incline (3031); the middle low flat lying (3032) is formed between the left side incline (3033) and the right side inclines (3031).

4. The combination control assembly according to claim 3, characterized in that, a choke cable assembly (7) fixed on the bracket (5) includes a choke cable (701), a biasing spring (702) and a choke cable guider (703); the choke cable guider (703) is fixed on the bracket (5); the choke cable (701) is disposed in the choke cable guider (703); the biasing spring (702) presses the end of choke cable (701) on the orbit (303) formed on the turntable (3), and the choke cable guider (703) limits the choke cable (701) only axially movable.

5. The combination control assembly according to claim 2, characterized in that, an indicator panel (1) fixed on the bracket (5) through the cooperation of the erection column (101) and the corresponding holes settled on the bracket (5); the dial (2) is disposed in the indicator panel (1).

6. The combination control assembly according to claim 5, characterized in that, a first bump (3011) at the edge of the disk body (301) of the turntable (3); a flameout switch (8) fixed on the indicator panel (1); the first bump (3011) is positioned to interfere with the engine flameout switch (8), controlling the on-off state of engine flame switch (8).

7. The combination control assembly according to claim 5, characterized in that, a second bump (903) formed at the second rotating part (9); an inching switch (10) settled on the indicator panel(1); the second bump (903) is positioned to interfere with the inching switch (10), controlling the on-off state of inching switch (10).

\* \* \* \* \*